United States Patent [19]

Peter et al.

[11] 4,210,016

[45] Jul. 1, 1980

[54] FLOW RATE METER WITH TEMPERATURE-DEPENDENT RESISTOR

[75] Inventors: Cornelius Peter, Stuttgart; Bernd Kraus, Gerlingen, both of Fed. Rep. of Germany

[73] Assignee: Robert Bosch GmbH, Stuttgart, Fed. Rep. of Germany

[21] Appl. No.: 935,056

[22] Filed: Aug. 18, 1978

[30] Foreign Application Priority Data

Nov. 5, 1977 [DE] Fed. Rep. of Germany ....... 2749575

[51] Int. Cl.² .............................................. G01F 1/68
[52] U.S. Cl. ..................................................... 73/116
[58] Field of Search ........................ 73/116, 204, 707; 138/41; 123/32 EJ

[56] References Cited

U.S. PATENT DOCUMENTS

| | | | |
|---|---|---|---|
| 1,694,838 | 12/1928 | Bayha | 73/707 |
| 2,255,771 | 9/1941 | Golay | 73/204 |
| 2,486,133 | 10/1949 | Egger | 73/707 |
| 3,945,402 | 3/1976 | Murphy | 138/41 |
| 3,962,917 | 6/1976 | Terada | 73/204 |
| 3,964,519 | 6/1976 | DeBaum | 138/41 |
| 4,067,233 | 1/1978 | Obayashi et al. | 73/204 |
| 4,089,215 | 5/1978 | Chapin | 73/116 |

FOREIGN PATENT DOCUMENTS 1245138 12/1971 United Kingdom ...................... 73/204

*Primary Examiner*—Herbert Goldstein
*Attorney, Agent, or Firm*—Edwin E. Greigg

[57] ABSTRACT

A flow rate measuring device, especially for measuring the flow rate of incoming fresh air in the induction tube of an internal combustion engine in which a temperature-dependent sensor, e.g. a resistor, is exposed to the air flow while the current through the sensor is controlled and monitored to obtain a signal related to the air flow rate. In order to prevent damage to the sensor from high-temperature flame fronts due to backfiring and also from inadvertent mechanical contact with tools, etc., there is provided at least one protective element downstream of the sensor and possibly another element upstream. The protective element is a plate-like barrier permitting essentially unimpeded air flow. The pattern of the element may be a grid or sieve, a honeycomb pattern or a plurality of parallel tubes.

5 Claims, 4 Drawing Figures

FLOW RATE METER WITH TEMPERATURE-DEPENDENT RESISTOR

BACKGROUND OF THE INVENTION

The invention relates to flow rate meters. More particularly, the invention relates to a flow rate meter for measuring the rate of flow of a gas, especially the inducted air for an internal combustion engine. The invention especially relates to an air flow rate meter including a temperature-dependent resistor which is exposed to the air flow and which may be heated by external means. In known hot wire or hot film air flow rate meters, the measuring wire or film is subject to inadvertent damage due to careless handling as well as to damage from flame fronts which propagate from the engine when backfires occur.

OBJECT AND SUMMARY OF THE INVENTION

It is a principal object of the invention to provide an air flow rate sensor of the general type described above which is protected against careless handling and against damage which may occur during engine backfiring. In particular, the temperature of the flame front occurring during backfiring is to be reduced.

This object is attained, according to the invention, by placing a transverse grating in the induction tube downstream of the flow rate meter. The presence of this grating which permits the flow of air virtually unimpeded nevertheless causes a distinct reduction in the flame front temperature of flames that reach the induction tube during engine backfiring.

In one embodiment of the invention, the grating is embodied in the manner of a sieve. In other embodiments, the grating has a honeycomb configuration or a multitude of parallel tubules. It is a further feature of another embodiment of the invention to place a second grating in the induction tube upstream of the temperature-dependent resistors which form the flow rate meter so as to serve as a further protection against inadvertent mechanical damage, for example touching by service personnel, etc., at the same time as serving for an air flow director which tends to make the incoming air flow more uniform and thus tends to reduce the spurious effects of non-uniform air flow patterns on the characteristics of the flow rate sensor.

The invention will be better understood as well as further objects and advantages thereof become more apparent from the ensuing detailed description of several embodiments taken in conjunction with the drawing.

DESCRIPTION OF THE PREFERRED EMBODIMENTS

Figure 1:
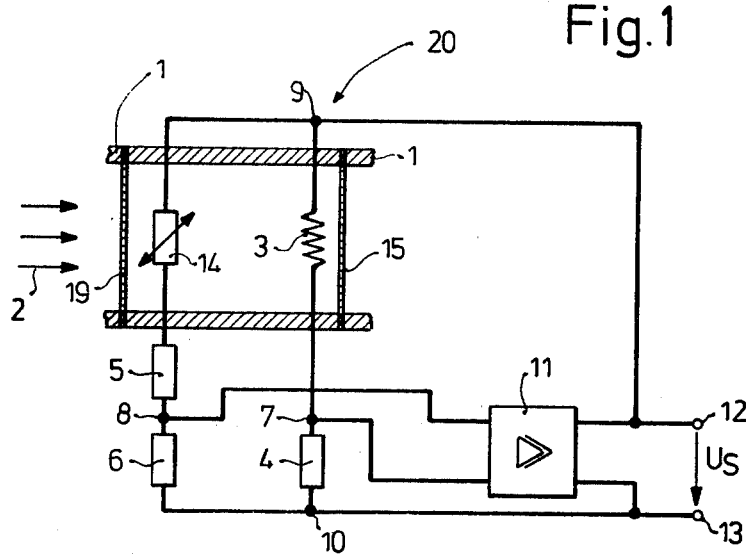
FIG. 1 is a circuit diagram of the electrical components of the flow rate sensor according to the invention including the protective gratings.

Turning now to FIG. 1, there will be seen an induction tube 1 belonging to the intake manifold of an internal combustion engine, not shown, through which air flows in the direction of the arrows 2. The induction tube 1 includes a flow rate sensor 20 with at least one temperature-dependent resistor 3, for example a hot wire or a hot film, which carries an electrical current of controlled magnitude and which supplies the actual value signal for the controller 11. The controller holds the temperature of the resistor 3 at a level somewhat above the average air temperature. If the air flow rate increases, i.e., the velocity of the flowing air increases, the temperature of the resistor 3 tends to drop. This drop in temperature results in a change of resistance and hence a change in the voltage drop across the resistor which is sensed at the input of the controller 11, which thereby changes its output current until the predetermined temperature of the resistor 3 is attained again. Thus, the controller 11, embodied schematically by a differential amplifier 11, continuously attempts to hold the temperature of the resistor 3 at a constant magnitude in spite of fluctuations in the air flow rate, so that its output current, at the same time, may be used in a regulating device to show the prevailing air flow rate. The measuring resistor 3, which is temperature-dependent, may be connected in series with a fixed resistor 4 in a first arm of a measuring bridge which has a second arm consisting of series-connected resistors 5 and 6. The two arms of the bridge are connected in parallel at junctions 9 and 10. At the point 8, a reference voltage is taken to one input of the differential amplifier 11 while the voltage at the point 7 between the measuring resistor 3 and the resistor 4 is taken to the second input of the differential amplifier 11. The points 9 and 10 are connected across the outputs of the differential amplifier and are thus supplied with operating current. The output voltage of the differential amplifier, designated $U_S$, may be used externally at contacts 12 and 13 for purposes of providing an input signal to fuel management systems and the like. In particular, the signal $U_S$ may be used to control the amount of fuel supplied to the engine for the prevailing air flow rate in a known but unillustrated fuel metering system for providing an optimum fuel-air mixture to the engine so as to produce maximum power with the lowest possible amounts of toxic exhaust components. The current flowing through the temperature-dependent resistor 3 heats this resistor until the input voltage to the differential amplifier equals the voltage at the other input or some different, predetermined voltage. The output of the amplifier 11 is thus a controlled current flowing into the bridge circuit. If the air flow rate changes, the temperature of the resistor 3 also changes, as does its resistance, which causes a change in the voltage difference between the points 7 and 8, causing the amplifier 11 to correct the output current supplied to the points 9 and 10 until such time as the bridge is balanced or has reached a predetermined degree of imbalance. Accordingly, the output voltage $U_S$, as well as the current through the resistor 3, constitute a measure for the prevailing air flow rate.

Figure 2:
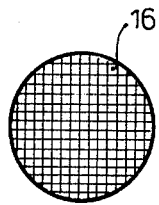
FIGS. 2, 3 and 4 are different embodiments of the structural form of the protective gratings of the invention.
Figure 3:
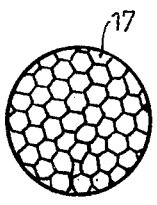
Figure 4:
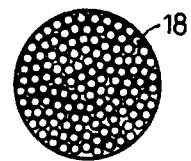

In order to compensate for the influence of the temperature of the aspirated air on the measured result, it may be suitable to supply a second temperature-dependent compensating resistor 14 in the second arm of the bridge. The magnitude of the resistances of the resistors 5, 6 and 14 should be so chosen that the power loss due to the current flowing through the second temperature-dependent resistor 14 is so low that its temperature is unaffected by changes of the bridge voltage but always corresponds substantially to the temperature of the air flowing around it. When the engine backfires, a flame and pressure front may propagate through the induction tube and may reach the flow rate sensor 20. The temperature-dependent resistors 3, 14 in the flow rate sensor 20 are particularly sensitive to damage by the high temperatures occurring in the flame front during engine backfires. The disposition of a protective grating 15 downstream of the temperature-dependent resistors transversely to the air flow tends to reduce the temperature of the flame front substantially and thus prevents a detrimental effect on the measuring capability of the resistors or even mechanical damage. The protective grating 15 is of such a configuration as to largely permit unimpeded air flow and presents as low a flow resistance as possible. The pattern in the grating can be embodied in various ways. For example, as shown in FIG. 2, it may be a sieve-like pattern 16 whereas FIG. 3 shows a honeycomb pattern 17 and FIG. 4 shows a pattern of parallel tubules 18. The protective element 15 also serves as protection against the mechanical damage of the measuring resistors, for example due to inadvertent touching by service personnel and the like. For this reason, it may be advantageous to dispose a further protective grating 19 upstream of the temperature-dependent resistors 3,14 to serve as a further protection against inadvertent mechanical damage. The upstream grating may also be embodied as patterned grating permitting free flow therethrough. In particular, it is an additional purpose of the upstream grating 19 to serve as an air flow director which tends to make the air flow pattern uniform within the induction tube, thereby reducing the effect of different flow patterns on the characteristics of the measuring sensor. The protective gratings 15, 19 may be disposed independently in the induction tube or may be integrated in the construction of the flow rate sensor 20.

The foregoing relates to preferred exemplary embodiments of the invention, it being understood that other embodiments and variants thereof are possible within the spirit and scope of the invention.

What is claimed and desired to be secured by Letters Patent of the United States is:

1. A flow rate measuring device for measuring the flow of induced air in the induction tube of an internal combustion engine including at least one temperature-dependent sensor in said induction tube, the resistance of which is related to the flow rate to be measured, and wherein the improvement comprises:

a first grating, disposed in said induction tube downstream of said at least one temperature-dependent sensor, said first grating being substantially plate-like, the plane of said grating being substantially transverse to the direction of flow of said induced air and the structure of said first grating being such as to permit substantially unimpeded flow of said induced air therethrough and to reduce the temperature of a flame front occurring during backfiring thereby preventing destruction of said at least one temperature-dependent sensor.

2. A measuring device according to claim 1, wherein the structure of said first grating is a sieve-like pattern.

3. A measuring device according to claim 1, wherein the structure of said first grating is a honeycomb pattern.

4. A measuring device according to claim 1, wherein said structure is a plurality of parallel tubules, the axis of which coincides with the flow vector.

5. A measuring device according to claim 1, further comprising a second grating, substantially similar to said first grating, and disposed upstream of said at least one temperature-dependent sensor.

* * * * *